US010275577B2

(12) United States Patent
Gorman et al.

(10) Patent No.: US 10,275,577 B2
(45) Date of Patent: Apr. 30, 2019

(54) DIGITAL MEDIA CONTENT MANAGEMENT APPARATUS AND METHOD

(71) Applicant: NOW TECHNOLOGIES (IP) LIMITED, London (GB)

(72) Inventors: Christopher Simon Gorman, London (GB); Nicholas Charles Geary Lycett, London (GB)

(73) Assignee: Now Technologies (IP) Limited, London (GB)

(*) Notice: Subject to any disclaimer, the term of this patent is extended or adjusted under 35 U.S.C. 154(b) by 148 days.

(21) Appl. No.: 14/777,513

(22) PCT Filed: Mar. 17, 2014

(86) PCT No.: PCT/GB2014/050840
§ 371 (c)(1),
(2) Date: Sep. 15, 2015

(87) PCT Pub. No.: WO2014/140650
PCT Pub. Date: Sep. 18, 2014

(65) Prior Publication Data
US 2016/0070888 A1 Mar. 10, 2016

Related U.S. Application Data

(63) Continuation of application No. 13/843,824, filed on Mar. 15, 2013, now Pat. No. 9,075,960.

(51) Int. Cl.
G06F 21/10 (2013.01)
G06F 21/62 (2013.01)
(Continued)

(52) U.S. Cl.
CPC .............. G06F 21/10 (2013.01); G06F 21/60 (2013.01); G06F 21/62 (2013.01);
(Continued)

(58) Field of Classification Search
CPC ........... G06F 21/10; G06F 21/60; G06F 21/62
(Continued)

(56) References Cited

U.S. PATENT DOCUMENTS 5,715,403 A 2/1998 Stefik
6,675,382 B1 1/2004 Foster
(Continued)

FOREIGN PATENT DOCUMENTS

EP 0715243 A1 6/1996
EP 1134920 A2 9/2001
(Continued)

OTHER PUBLICATIONS

Hilt, "Recording and Playing Back Interactive Media Streams", Oct. 2005, IEEE, vol. 7, pp. 960-971 (Year: 2005).*
(Continued)

Primary Examiner — Taghi T Arani
Assistant Examiner — Gregory A Lane
(74) Attorney, Agent, or Firm — Arent Fox LLP

(57) ABSTRACT

A digital media content management apparatus and method for securely storing a content file on a computer readable medium and playing the content file from the computer readable medium is disclosed. The content file comprises control information readable by a content player and payload information including content data. The content file is deconstructed into at least one control information portion and at least one payload information portion being undetectable to a content player of a user device. The control information portion and the payload information portion are separately stored, and at least one of the portions is associated with packing data, and the packing data associated with at least one of the portions comprises a reference to the location of the other portion.

22 Claims, 6 Drawing Sheets

(51) Int. Cl.
*H04L 29/06* (2006.01)
*G06F 21/60* (2013.01)

(52) U.S. Cl.
CPC ...... *G06F 21/6209* (2013.01); *G06F 21/6218* (2013.01); *H04L 63/10* (2013.01)

(58) Field of Classification Search
USPC .......................................................... 726/28
See application file for complete search history.

(56) References Cited

U.S. PATENT DOCUMENTS

| | | | |
|---|---|---|---|
| 6,950,520 B1 * | 9/2005 | Ryan ...................... | H04N 5/913 348/E7.056 |
| 6,950,941 B1 * | 9/2005 | Lee ......................... | G06F 21/10 713/156 |
| 6,985,588 B1 * | 1/2006 | Glick ....................... | G06F 21/10 380/258 |
| 2001/0047290 A1 | 11/2001 | Petras et al. | |
| 2003/0061369 A1 | 3/2003 | Aksu et al. | |
| 2006/0069753 A1 | 3/2006 | Hu et al. | |
| 2006/0107046 A1 | 5/2006 | Raley et al. | |
| 2006/0165381 A1 * | 7/2006 | Eckleder ............... | G11B 27/105 386/330 |
| 2006/0232449 A1 | 10/2006 | Jain et al. | |
| 2006/0265758 A1 | 11/2006 | Khandelwal et al. | |
| 2006/0287916 A1 | 12/2006 | Starr et al. | |
| 2007/0053260 A1 * | 3/2007 | Reckless .......... | G11B 20/00086 369/47.12 |
| 2007/0073728 A1 | 3/2007 | Klein et al. | |
| 2007/0089174 A1 | 4/2007 | Bader et al. | |
| 2007/0203917 A1 * | 8/2007 | Du ......................... | H04L 12/582 |
| 2007/0226365 A1 | 9/2007 | Hildreth et al. | |
| 2007/0247979 A1 | 10/2007 | Brillon et al. | |
| 2007/0266446 A1 | 11/2007 | Aaron | |
| 2007/0268905 A1 * | 11/2007 | Baker ................... | H04L 1/0052 370/392 |
| 2008/0010372 A1 | 1/2008 | Khedouri et al. | |
| 2008/0059878 A1 * | 3/2008 | Ootani ................... | H04N 5/775 715/273 |
| 2008/0066181 A1 | 3/2008 | Haveson et al. | |
| 2008/0184359 A1 | 7/2008 | Khedouri et al. | |
| 2008/0187115 A1 | 8/2008 | Khedouri et al. | |
| 2008/0201376 A1 | 8/2008 | Khedouri et al. | |
| 2008/0249961 A1 | 10/2008 | Harkness et al. | |
| 2008/0288365 A1 | 11/2008 | Fisher, III et al. | |
| 2008/0288411 A1 | 11/2008 | Copley | |
| 2009/0049074 A1 | 2/2009 | Dara-Abrams et al. | |
| 2009/0164801 A1 | 6/2009 | Kawahara | |
| 2009/0171715 A1 | 7/2009 | Conley et al. | |
| 2010/0031366 A1 | 2/2010 | Knight et al. | |
| 2010/0255812 A1 | 10/2010 | Nanjundaiah et al. | |
| 2011/0015968 A1 | 1/2011 | Carlson | |
| 2011/0058675 A1 | 3/2011 | Brueck et al. | |
| 2011/0119233 A1 | 5/2011 | Reddy | |
| 2011/0153751 A1 | 6/2011 | Rice | |
| 2011/0247086 A1 * | 10/2011 | Ohno ....................... | G06F 21/10 726/31 |
| 2012/0023201 A1 | 1/2012 | Gideon et al. | |
| 2012/0254927 A1 | 10/2012 | Kim et al. | |
| 2012/0307655 A1 | 12/2012 | Vyrros et al. | |
| 2013/0006868 A1 | 1/2013 | Hawkes et al. | |
| 2013/0018961 A1 | 1/2013 | Svendsen | |
| 2013/0030956 A1 | 1/2013 | Kim | |
| 2013/0097302 A9 | 4/2013 | Khedouri et al. | |

FOREIGN PATENT DOCUMENTS

| | | |
|---|---|---|
| JP | 2001-195828 | 7/2001 |
| JP | 2007-006515 | 1/2007 |
| WO | 2002057890 | 11/2002 |
| WO | 2002089439 | 11/2002 |
| WO | 2003009166 | 1/2003 |
| WO | 2006099407 | 9/2006 |
| WO | 2007089092 | 8/2007 |
| WO | 2013075020 | 5/2013 |

OTHER PUBLICATIONS

EP Communication dated Jul. 8, 2016, regarding EP Application No. EP14716375.5.
International Search Report and Written Opinion dated Oct. 7, 2014 regarding PCT/GB2014/050840.
International Search Report and Written Opinion regarding PCT Application No. PCT/GB2011/050855, dated Aug. 23, 2011.
International Search Report regarding PCT Application No. PCT/GB2009/001506, dated Sep. 4, 2009.
M. Tungare, et al., XP002542514, "Thinking Outside the (Beige) Box: Personal Information Management Beyond the Desktop," Proc. Personal Information Management: PIM 2008, CHI 2008 Workshop.
Marc A. Kaplan: "IBM Cryptolopes, Superdistribution and Digital Rights Management," Internet 2 Citation, Dec. 30, 1996, P002132994, Retrieved from Internet: URL: http://www.research.ibm.com/people/klkaplan/cryptolope-docs/crypap.html [retrieved on Mar. 14, 2000] Section "Cryptolope—a cryptographic envelope" D Section "Buying a cryptolope" Section "Variations, extension on the three party system".
Notice of Reasons for Rejection dated Dec. 19, 2017, regarding Japanese Patent Application JP2015-562339.

* cited by examiner

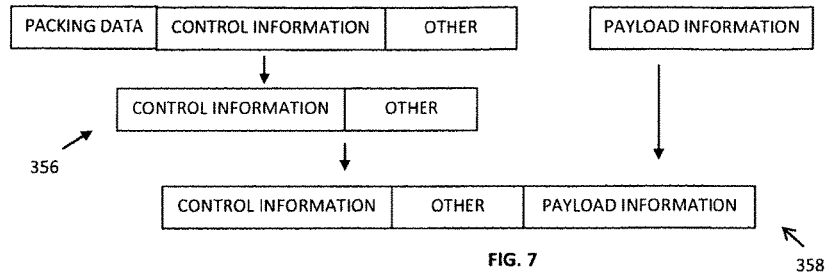
FIG. 7
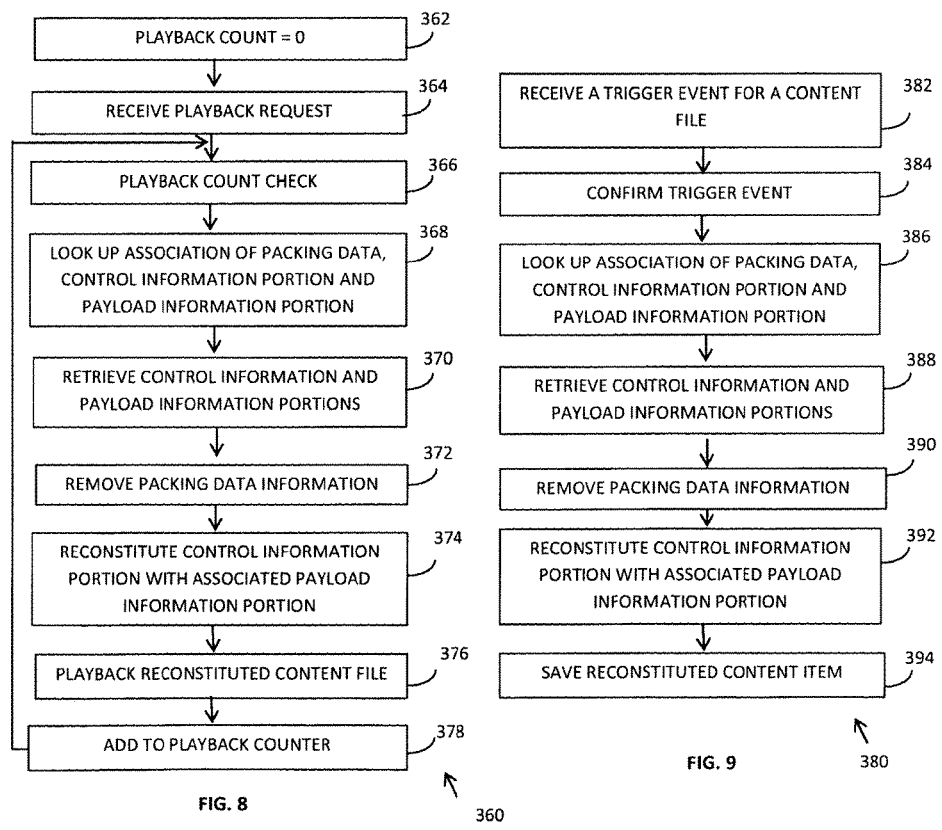
FIG. 8
FIG. 9

DIGITAL MEDIA CONTENT MANAGEMENT APPARATUS AND METHOD

CROSS-REFERENCES TO RELATED APPLICATIONS

This application is a United States national phase application of International Patent Application Number PCT/GB2014/050840, filed on Mar. 17, 2014, which claims priority to U.S. patent application Ser. No. 13/843,824, filed Mar. 15, 2013, entitled DIGITAL MEDIA CONTENT MANAGEMENT APPARATUS AND METHOD, now U.S. Pat. No. 9,075,960, the disclosures of which are incorporated herein by reference in their entireties.

TECHNICAL FIELD

This invention relates to apparatus and method for providing digital media content to a user device and controlling at least temporary access of the user device to the digital content, and more specifically for providing digital media content to a user device and controlling at least temporary access of the user device to the digital media content.

BACKGROUND

Digital rights management (DRM) is commonly used by content publishers and distributors in an attempt to limit access to digital content. DRM technology is used in all forms of digital or electronic formats of documents, books, music, voice, audio, photographs, pictures, films, television, video, gaming, ringtones, ringback tones and the like. DRM techniques typically use file encryption based on accepted algorithms such as Huffman encryption, Open Mobile Alliance (OMA) version 1, OMA version 2, or the like which are delivered in a container that decrypts the file in order to limit the access to the digital content. Such DRM mechanisms add to the overall system complexity, may increase system processing time and resources, and may increase implementation costs. There is a need for digital content management apparatus and method that addresses or at least alleviates the above whilst at the same time offering a unique yet secure means of transmitting, storing and making available for use, digital media content.

SUMMARY

An aspect of the invention is a method of securely storing a content file on a computer readable medium and playing the content file from the computer readable medium, the method comprising receiving a content file, the content file comprising control information readable by a content player and payload information including content data; deconstructing the content file into at least one control information portion and at least one payload information portion; separately storing the control information portion and the payload information portion; wherein at least one of the portions is associated with packing data, and the packing data associated with at least one of the portions comprises a reference to the location of the other portion.

In an embodiment the computer readable medium is on an end-user device comprising a content player. Then at least one of the control information portion and the payload information portion may be stored in a part of the end user device not visible to a user in normal use. The control information portion and the payload information portion may be stored in the persistent or non-volatile RAM of the user device that is inaccessible by the average user. The content player on the end user device may be configured to play the content file by accessing reference information and reconstituting the control information portion and payload information portion into a reconstituted content file such that the reconstituted content file is delivered to the content player in real-time. The content player of the end user device may be configured to deconstruct the content file into at least one control information portion and at least one payload information portion and store at least one control information portion and at least one payload information portion on a computer readable medium of the device after the content file has been played based on access information indicating temporary access. The content player of the end user device may be configured to receive deconstructed content file portions comprising at least one control information portion and at least one payload information portion and store at least one control information portion and at least one payload information portion on a computer readable medium of the device after the content file has been played based on access information indicating temporary access.

In an embodiment the player of the end user device is configured to store the reconstituted file after playing based on access information indicating non-temporary access.

In an embodiment the content player of the end user device is configured to cause reconstitution of the control information portion and the payload information portion into a playable content file and store without playing in response to access information.

In an embodiment the content file is encoded to reduce the file size and selectively remain unsuitable for distribution and playback. The content file may be video, audio, games, ringtones, or ringback tones. The content file may be audio in an advanced audio coding (AAC) format. The content file may be audio in any suitable audio codec. The random data information may be added to header information of the content file. This could be any distribution method. In an embodiment of this the file is distributed using radio networks such as public access radio spectrum, WiFi, WiMax, Bluetooth, GSM or CDMA.

An aspect of the invention is an apparatus configured to securely store a content file on a computer readable medium and play the content file from the computer readable medium, the apparatus comprising an ingestion module configured to receive a content file, the content file comprising control information readable by a content player and payload information including content data, and a deconstruction module to deconstruct the content file into at least one control information portion and at least one payload information portion, and separately store the control information portion and the payload information portion on the computer readable medium; wherein at least one of the portions is associated with packing data, and the packing data associated with at least one of the portions comprises a reference to the location of the other portion.

BRIEF DESCRIPTION OF THE DRAWINGS

For better understanding of the invention and to show how the same may be carried into effect, reference will now be made, by way of example only, to the accompanying figures, in which:

FIG. 7 illustrates schematically reconstituting of the reconstituted content file in accordance with an embodiment of the invention;

FIG. 8 is a flow chart of a method of playback of the reconstituted content file based on access information indicating temporary access in accordance with an embodiment of the invention;

FIG. 9 is a flow chart of a method of playback of the reconstituted content file based on access information indicating non-temporary access in accordance with an embodiment of the invention.

DETAILED DESCRIPTION

References will now be made in detail to the embodiments of the invention, examples of which are illustrated in the accompanying figures. In the following detailed description, numerous specific details are set forth in order to provide a thorough understanding of the invention. However, it will be apparent to one of ordinary skill in the art that the invention may be practiced without these specific details.

Figure 1:
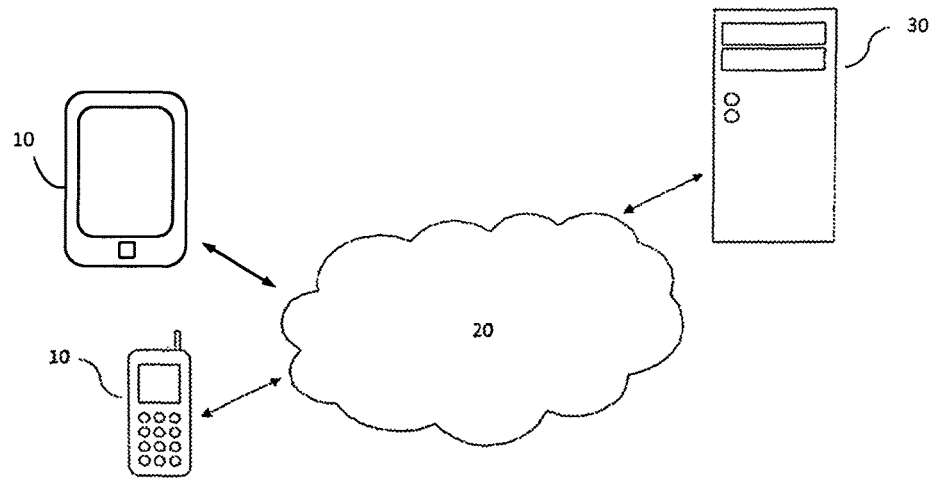
FIG. 1 illustrates schematically an overview of the system in accordance with an embodiment of the invention.

FIG. 1 illustrates schematically an overview of the system in accordance with an embodiment of the invention. The system comprises a user device 10. In one embodiment, the user device is a mobile telephone 10 and/or a tablet 10. However, the user device 10 may be any device such as a MP3 player, a lap top computer, a personal digital assistant (PDA), or the like which is provided with a communication interface and music playing capabilities with any type of communication capability such as wireless, WiFi, WiMax, third generation mobile technology (3G), fourth generation mobile communication technology (4G), or the like. The user device 10 communicates with a server 30 over the internet 20 and/or the mobile communication network 20. Systems of this type are described in U.S. patent application Ser. No. 12/772,058 incorporated herein by reference.

In this description, the term "chart" refers to a list of a ranking of content according to popularity over a given period of time or according to editorial expertise or a list or playlist, ordered or unstructured. Examples of charts published in the music industry include: branded ordered playlist (BOP) such as the Billboard 100, MW Club Charts, Hot 100 or Top 40. Charts exist for other types of digital media content or mobile digital media content accessories and the term used herein is not intended to be limited to music unless expressly so limited. Charts may be compiled for example on different measures of popularity, for example retail purchases, download or streaming.

A user is able to download an application from the server 30 to the user device 10, or the application may be provided at the user device 10 prior to purchase by the user. Digital media content, for example music content or other content or information, may be embedded within the user application such that some consumable content or other information is available from when the application first arrives on the user device 10. The application enables the user to view a listing of media content such as a chart or list of content, such as a music chart, in one example a top 40 songs chart. The chart may also be a top 10, a top 20 etc. and/or may be based on a genre such as the top 40 R&B songs, the top 40 classical songs, or a branded chart, and may be determined for example based on the number of radio plays, the number of downloads, etc. In addition, the content may be for example music, music videos, movies, TV programmes, user generated clips (such as You-Tube) and the chart may represent the popularity of the digital media content. The digital media content may be audio, video, music, games, books, ringtones, ringback tones, and the like. The media content may be presented to the user in whole or in part or a limited or unlimited version of the digital media content. For example, the media content may be presented such as only allowing access to level 1 for a multi-level game, part of a music song, part of a music chart, chapters of a book, 30 seconds of a song, a page of a book or chapter, and the like. The digital media content may be presented in a limited time format for example for an hour, a day, or a week, and the like, or limited play format for example for a single playback, or set number of playbacks.

Together with being able to view the media content in a list such as a chart, on a display 170 provided at the user device 10, the user is also provided temporary or permanent content consumption rights in respect of individual content items in the chart according to content consumption permissions defined in a server. The permissions may define one or more of how the user can play the content (e.g. stream and/or download), whether the user is allowed to share the content with other users and how many users, whether the user is allowed to play the content any number of times within a predetermined period of time (duration of use, such as two days or a week), or whether the number of plays is limited.

In the disclosed embodiment, it is possible to present targeted, and possibly, exclusive content to the user. For example, if the apparatus 200 knows from subscriber data and/or historical use data that a certain day is the birthday of a particular user, and that the particular user is a fan of a particular performing artist such as Coldplay or George Clooney, then the apparatus can cause transmission of specifically timed content message, for example an exclusive video from Coldplay or George Clooney wishing the user a happy birthday.

Figure 2:
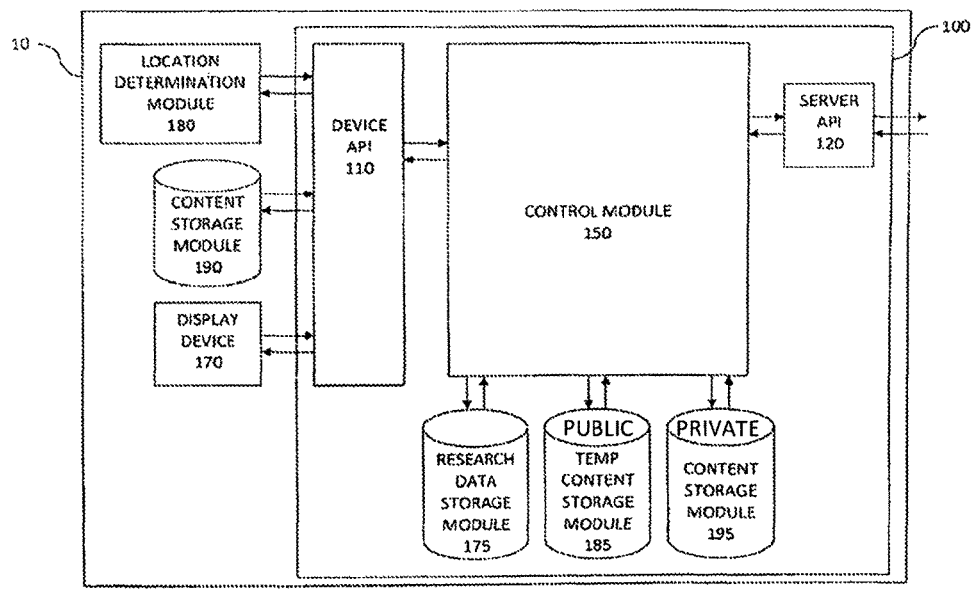
FIG. 2 illustrates schematically an apparatus provided at a user device in accordance with an embodiment of the invention.

FIG. 2 illustrates schematically the application 100 which is provided at the user device 10 in accordance with an embodiment of the invention. The application 100 has a device interface 110 which enables the application 100 to interface with components of the device 10. The device 10 is illustrated as having a location module 180, a content storage module 190 and a display device 170. However, the device 10 will have other features which are commonly known in user devices 10 and which are not described herein. For example, the device 10 is provided with at least one processor which is not illustrated. The processor may be utilized by the application 100.

In an embodiment, the location determination module 180 may have a WiFi module with a unique identifier such as a media access control address (MAC) address, a wireless wide area network (WWAN)/radio access network (RAN) module with a unique identifier international mobile equipment identity (IMEI), or the like. In the case the location determination module 180 has a WWAN/RAN module the location determination module should also have a means of connection to a WWAN/RAN with a user identity module (SIM card) and with the subscriber identity module (SIM) card, the associated international mobile subscriber identity (IMSI)/mobile subscriber integrated services digital network number (MSISDN). It will be appreciated that the location determination module 180 could be broadly considered to do all of the above, or simply be considered as a global positioning system (GPS) module. Accordingly, the elements of the location determination module 180 of the user device 10 may enhance DRM by adding subscriber specific, location encryption/decryption, and the like.

A control module 150 of the application 100 has access to a server interface 120 which interfaces with the server 30 in this case via a mobile data network 20. Furthermore, the control module 150 has access to a research data storage module 175, a temporary content storage module 185 and a content storage module 195. In one embodiment the content storage module 195 is not required since the control module 150 has access to the content storage module 190 provided at the user device 10 via the device interface 110. In an embodiment, the content items and content files are stored in a "public space", or temporary content storage module 185, while the user has access information indicating temporary access. All user and content metadata is stored within the private application areas of random access memory (RAM), persistent memory, non-volatile memory, or the like, and is not accessible by users on the userdevice. In an embodiment, the "public space" temporary content storage module 185 has a part of the file system that is not visible to the user in normal use, for example, the files are not visible in the operating system file library to the user. In an embodiment, the content items and content files are stored in the "private space", or content storage modules 190,195 while the user has access information indicating non-temporary access. In an embodiment, the content of the file including the metadata, images, other constituent parts of the content file, and the like are obfuscated from the user. In an embodiment due to the manner and method of the obfuscation the user will only become aware of content associated with the application after they have purchased the content. In another embodiment of the application the user may purchase content from a third party content partner therefore no content is ever associated with the related directories that are visible to the user.

Figure 3:
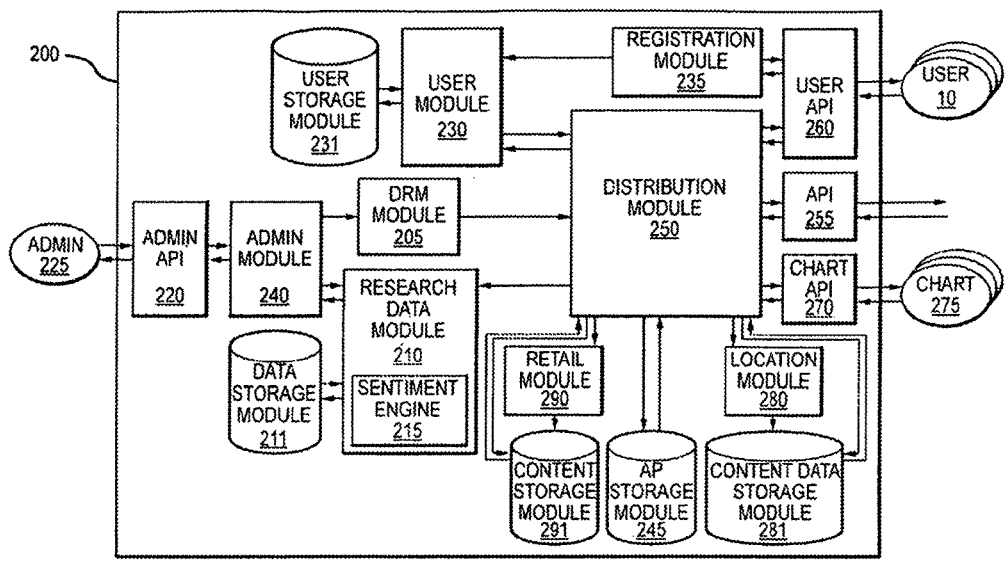
FIG. 3 illustrates schematically an apparatus provided at a server in accordance with an embodiment of the invention.

FIG. 3 illustrates schematically the apparatus 200 provided at the server 30 in accordance with an embodiment of the invention. The apparatus 200 comprises a user interface 260 for interfacing with a plurality of user devices 10 via the internet/mobile network 20, an interface 255 for interfacing with one or more applications which provide functionality not provided by the server 200 via the internet/mobile network 20, and a digital media content interface 270 (as shown as chart API in FIG. 3) for interfacing with one or more of different chart providers 275 over the internet/mobile data network 20. The user interface 260 is connected to a registration module 235 which itself is connected to a user module 230 having access to a user storage module 231. When the user registers with the server 200, user information provided by the user is transferred from the user device 10 to the registration module 235 via the interface 260. The registration module transfers the user information to the user module which stores the data in the user storage module 231. In one embodiment, registration of the user is automatic during installation or first use of the software. In such cases, the control module 150 sends the registration module 325 a suitable user identifier, for example the user's unique MSISDN, IMEI/IMSI, MAC address, for example if there is no GSM/WWAN module, or the like and, optionally, also the make and model of the user's device. The user is not required to have a PC to register and use the application 100. The user may also be required to carry out multi-part authentication such as receiving and using a PIN code to activate the application or creating a username and password or a combination of any of the above.

In addition, the user interface 260, interface 255 and digital media content interface 270 are all connected to a distribution module 250. The distribution module 250 is capable of accessing a content storage module 291, an application storage module 245 and a content data storage module 281. The content storage module 291 may also be accessed via the retail module 290, and the content data storage module 281 may also be accessed via the location module 280. The distribution module 250 is connected to the research data module 210 which has access to a sentiment engine 215. The research data module 210 also has access to a research data storage module 211. An administrator module 240 which is accessible via an administrator interface 220 to at least one administrator 225 is also capable of accessing the research data module 210. This enables an administrator to configure research data to be monitored and recorded within the research data module 210. The administrator module 240 is also able to access the digital rights management (DRM) module 205 which has access to the distribution module 250.

Figure 4:
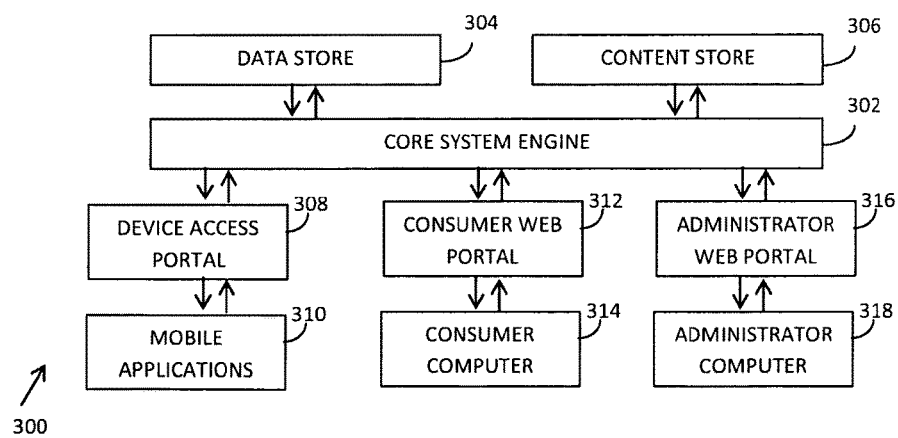
FIG. 4 illustrates schematically an overview of the intercommunication of components of the system in accordance with an embodiment of the invention.

FIG. 4 illustrates schematically an overview 300 of the intercommunication of components of the system in accordance with an embodiment of the invention. The core system engine 302 of the server 200 is in communication with the data store 304 and content store. In an embodiment the core system engine of the server is PHP: hypertext pre-processor (PHP) based system for processing requests to a standardized application programming interface (API). In another embodiment the core system engine may be any suitable programming framework that is most suited to the customer of the particular embodiment. The core system may be LAMP operating based package or any suitable operating system that is most suited to the customer of the particular embodiment. The data store 304 may be network-attached storage (NAS), or the like, as separated databases for client and administrator authentication and the like, and in an embodiment may be a MySQL database, or any suitable relational or non-relational database that is most suited to the customer of the particular embodiment. The content store 306 is arranged to be accessible only via the core system engine of the server and API with authentication. Content stored in the content store is stored in non-playable format, for example a data format that is not readable by a content player, such as when content store is referring to the staging area used prior to the delivery of the content to the application via the content delivery network (CDN). In an embodiment with the staging area into which the content is delivered from the providers of such content or media files, or the area where encoded media files are stored prior to the media files being made ready for distribution by the application of the DRM then the data is received in a playable format, and then formatted and stored in the non-playable format. Access to the core system is via portals such as device access portal 308 for mobile applications 310 such as BlackBerry, Android, J2ME, iOS and the like, consumer web portal 312 for a computer 314 of a consumer for consumer self-management, and administrator web portal 316 for a computer 318 of an administrator for administration of the system. The portals may or may not be arranged as hypertext transfer protocol (HTTP), user datagram protocol (UDP), hypertext transfer protocol secure (HTTPS) or the like web services for authenticated computers and mobile applications to communicate with the core system.

Figure 5:
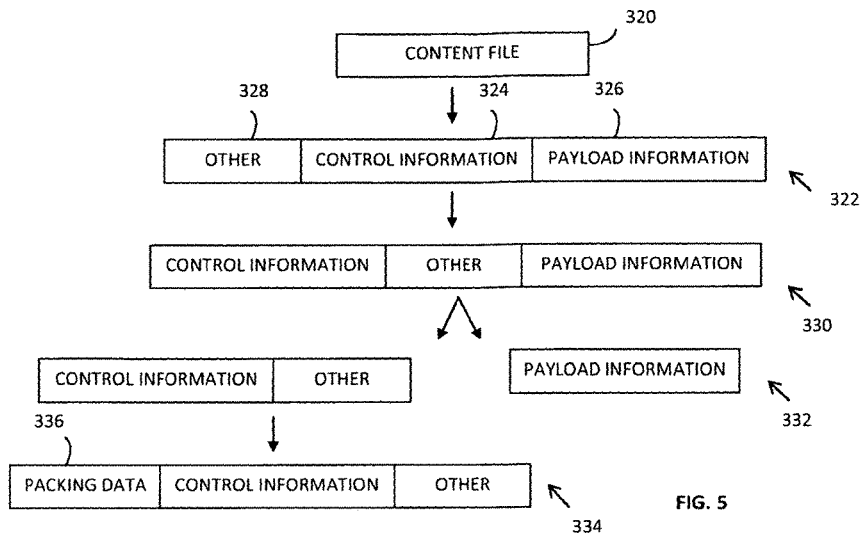
FIG. 5 illustrates schematically deconstructing of the content file into a control information portion and a payload information portion with associated packing data in accordance with an embodiment of the invention.

FIG. 5 illustrates schematically deconstructing of the content file into a control information portion and a payload information portion with associated packing data in accordance with an embodiment of the invention. A content file 320 in this embodiment is shown with the basic components 322 comprising control information 324, payload information 326, and other information components such as metadata, track information, unique identifier time stamp (UITS), unique identifier, digital watermarks, and the like. It will be appreciated that not all content types would have these attributes and new codecs and file types may introduce additional types. The content file components are reorganized 330 with the control information component arranged at an end of the data. The reorganized content file is deconstructed 332 as payload information portion or multiple payload information portions and control information portions. The payload information portion may contain digital content such as audio, video, and the like. The control information portion, or header, may be grouped with the other information components 328. Packing data 336 is added to either the payload information portion or the control information portion. The packing data may comprise a random number generated within the system. In an embodiment of this the payload portion may be stored as multiple smaller files that are in turn stored at multiple, dissociated locations but are all referenced by the control information portion, so that that they can be reconstituted when required for the period that they are required before being returned to their former constituent separate parts. The packing data obfuscates the control data making the control information portion undetectable by a content player making the file unreadable, unsuitable or undetectable and the DRM will not be able to use the content file whilst it remains in this state. In the embodiment shown, the packing data is added to the control information portion. The payload information portion may already be in a format undetectable by a media content player, however, packing data may be added to the payload information portion in the same manner. The payload information portion and the control information portion are saved as separate files, and are in a format that is either undetectable or unusable as was initially intended. Even though it may be possible to find the file and display the data as a digital representation of alpha numeric symbols and characters, the content in this format is useless to a media content player. The deconstructed content files may be stored in the "public space" temporary content storage module 185 has a part of the file system that is not visible to the user in normal use. Either the packing data contains reference to the location of the associated other portion or the association and location of the stored control information portion, payload information portion, and packing data may be recorded in a look up table (LUT), codes, in this instance the code may refer to the obfuscated locations of the constituent parts rather than the key that is used as the baseline for the encryption of the files (see comment below) or the like.

Figure 6:
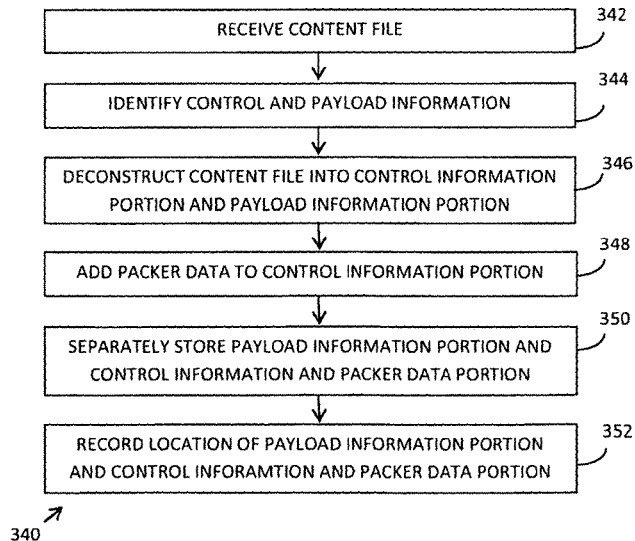
FIG. 6 is a flow chart of a method for the ingestion of digital content data in accordance with an embodiment of the invention.

FIG. 6 is a flow chart 340 of a method for the ingestion of digital content data as set out in FIG. 5 in accordance with an embodiment of the invention. Upon receiving the content file 342 the content file is in a format that is readily recognizable by commercially available content players. The content file may be encoded to a standard format such as for example advanced audio coding (AAC) for an audio content file, MPEG4/H624 for video, or any such file format that is appropriate for any digital media content. The control or header and payload or content information is identified 344 and the reordered with the control information at the front of the header since the component items of a file format may not be in the same order in every file and this will depend on the file type and/or codec associated with that file type at the time of making the file ready for distribution, such as for example an ACC file format based on MPEG4 container, or the like. Additional information may be included with the control information such as metadata, track information, unique identifier time stamp (UITS), unique identifier, digital watermarks, and the like, as described. The reordered content file is deconstructed 346, split, fragmented into at least one control information portion and at least one payload information portion. Packer data is added 348 to the control information portion. The payload information and control information with packer data portion is separately stored 350, and the location of the stored payload information portion and control information, and packer data is recorded 352. In an embodiment, the content items and content files are stored in a persistent RAM that are inaccessible by the user, or temporary content storage module 185 while the user has access information indicating temporary access. In an embodiment the deconstructed content files are obfuscated and stored separately without any visibly identifying link in the filename to prevent playback of the content file outside of the mobile application. Without the associated header or packer data information, the stored files of controller information portion and the payload information portion are meaningless and undetectable by a content player. For example, a media player may expect to see 32 byte file type box (ftyp) identifier at the head or front header of the file for an AAC file format based on mpeg4 container. By adding random data in front of the ftyp field, the MC file is rendered invisible to media players. The file names of the deconstructed content files of the control information portion and the payload information portion are randomized. The randomization of the filenames is to prevent association between the saved files of the control information portion and the payload information portion. The server generates unique codes that are required to un-encrypt, de-randomize, and re-assemble or reconstituted the deconstructed content file. The codes may be stored on the user device in the areas of persistent RAM or the like that are inaccessible by the user.

FIG. 7 illustrates schematically reconstituting of the reconstituted content file in accordance with an embodiment of the invention. The control information with packing data and the location of the payload information is recovered from the payload information, LUT or the like. The packing data is removed and the control information portion with other components 337 is then reconstituted with the payload information portion to and is a reconstituted content file 338. It will be appreciated that that in embodiments the metadata of the content file may be formatted and delivered as part of the total file, wrapped with the encoded file, placed after the file content, or the like.

FIG. 8 is a flow chart 360 of a method of playback of the reconstituted content file as set out in FIG. 7 based on access information indicating temporary access in accordance with an embodiment of the invention. Access to playback may be limited by a finite number of plays. Once the number of plays has been reached, access will be denied. The playback counter starts at zero 362 and is incremented after each play. In order to play the content, a playback request is received

364, and the playback count is checked 366 to confirm access is permitted. Once access is permitted, the location of the packing data, control information portion and payload information is recalled by either a LUT or within the packing data. Once the control information portion and the payload information portion are retrieved 370, the packer data is removed 372, and the control information portion is reconstituted 374 with the associated payload information portion. The reconstituted content file is then ready to be played by the content player. The reconstituted file is in a format that is detectable and playable on a content player. Once the content player has played or partially played the reconstituted file, the playback counter is incremented 378 and the reconstituted file is returned to the ingestion module for deconstructing the reconstituted content file. It will be appreciated that other embodiments use variants of how playback may be delivered, and events that trigger the application into re-constituting, decompiling or deconstructing the content file using the DRM methods in accordance with embodiments of the invention.

FIG. 9 is a flow chart 380 of a method of playback of the reconstituted content file as set out in FIG. 7 based on access information indicating non-temporary access in accordance with an embodiment of the invention. In addition to playback request discussed in FIG. 8, reconstitution of the content file by be triggered by specific events, such as purchase of the content file, i.e. purchase event, a reward, alteration of permission date, and the like. The notification of the trigger event is received 382 and confirmed 384 for reconstitution of the deconstructed and separately stored content file. If the notification of the trigger event permits a single play on a temporary basis, the reconstituted content file will be deconstructed after the play. If the notification of the trigger event changes the access permission to a non-temporary basis, the reconstituted content file will not be deconstructed after play and the user will be permitted to play the content file. The location of the packing data, control information portion and payload information is recalled by either a LUT or within the packing data. Once the control information portion and the payload information portion are retrieved 388, the packer data is removed 390, and the control information portion is reconstituted 392 with the associated payload information portion. The reconstituted content file is then ready to be played by the content player. The reconstituted file is in a format that is detectable and playable on a content player. If the access permissions are set to non-temporary after such a trigger event, the reconstituted file may be downloaded and saved anywhere by the user such as the private space or content storage modules 190,195 since the user has access information indicating non-temporary access.

Once the content file has been purchased, the content is released without limitation to the user (DRM free). In an embodiment the content file is an audio file and the track is reconstituted and rebuilt as a DRM free media file in the user accessible space. At this time, the reconstituted content file, or the original content file, is made available to the mobile platform on the user device for download and saved to user accessible storage on the user device. Before purchase and while the access permissions are set at temporary access, the content is only accessible using the application, and the content files cannot be accessed by native players or any third party applications. Upon purchase, the content files are reconstituted and become accessible by native players, any third party applications, or the like.

For example, in an embodiment the native media player is unable to access content whilst the content is part of a subscription based delivery as part of the application and service. The user first purchases the content via the application and the content is unlocked (becomes DRM free) and becomes accessible by the native or third party media players and becomes able to playback the DRM free content.

Accordingly, in an embodiment, rather than a streaming service, the system is a tethered content type service where content files and metadata associated with the content files are downloaded to the user device. The content file is separated and stored as separate controller information or header and payload or content portion data files that are stored with obfuscated filenames undetectable by commercially available content players. The controller information portion and the payload information portion may further be obfuscated with packing data information. The mobile application is arranged to access the required information to rebuild a reconstituted content file for playback in the mobile application. The handling and obfuscation of the content file in this manner ensures that the content file is not stored in "ready to play" format that is detectable by a content player at any time at the server, and that the content file is unable to be shared using transfer methods such as WiFi, Bluetooth, and the like, or used for any other purpose such as ringtones and the like, unless the content file has been purchased.

Figure 10:
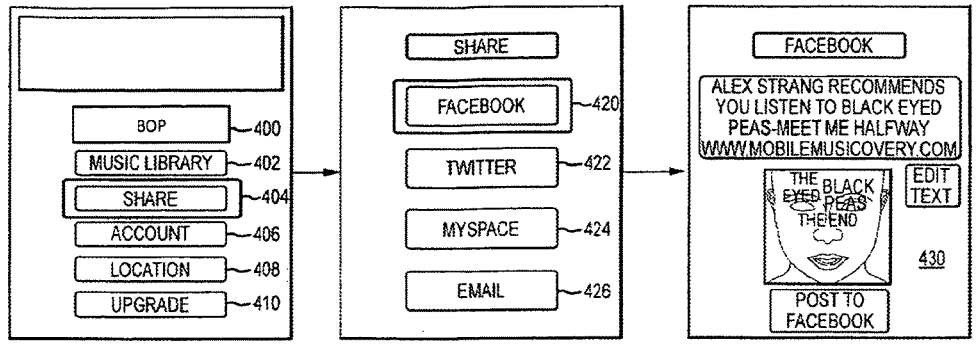
FIG. 10-12 illustrate schematically screen shots as they might appear on the user device in accordance with an embodiment of the invention.

FIG. 10 shows a screen presented to the user by the application 100 running on the user device 10 in accordance with an embodiment of the invention. The menu options include options to click on: branded ordered playlist (BOP) 400; the user's own music library 402; sharing functions 404; account set up 406; location services 408; and upgrade 410.

Figure 11:
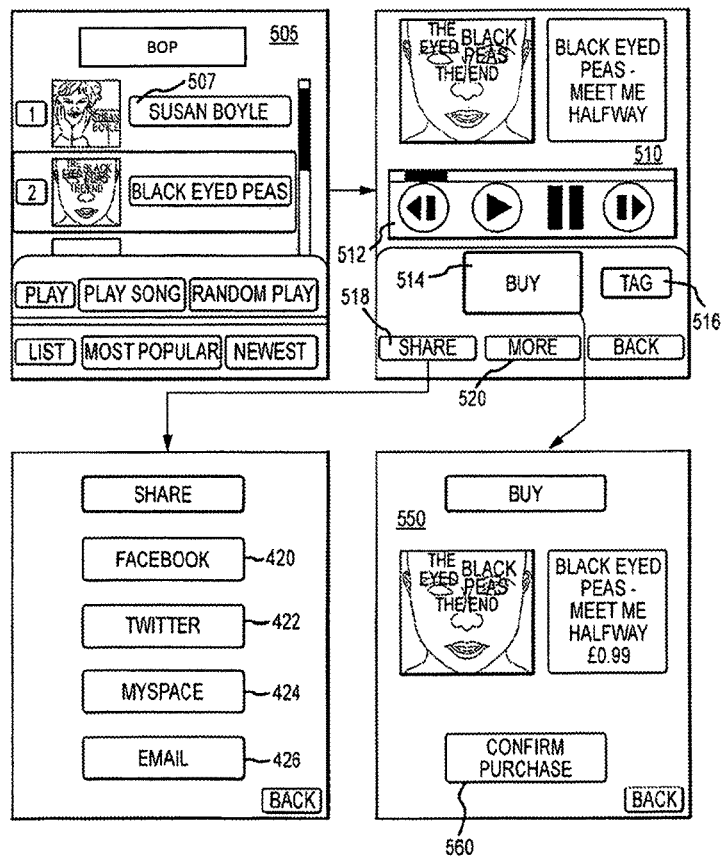

Selecting on branded ordered playlist (BOP) takes the user to screen 505 of FIG. 11 on which the listing of media content such as a chart list in this example is presented with highest positioned track 507 at the top. There are options to play individual tracks according to the subscriber permissions and filter to focus on tracks that represent the new chart entries. Pluralities of tracks can also be played for example based on popularity or randomly, according to permissions recorded in the DRM module 205. Selecting a track from this screen takes the user to a track level screen 510, with a control panel 512 incorporating buttons for forward, reverse, play and pause. This track level screen also presents buttons for buy 514, tag 516 and share 518. Selecting buy takes the user to a purchase confirmation screen 550 where the purchase of the track can be confirmed with a single click 560.

Figure 12:
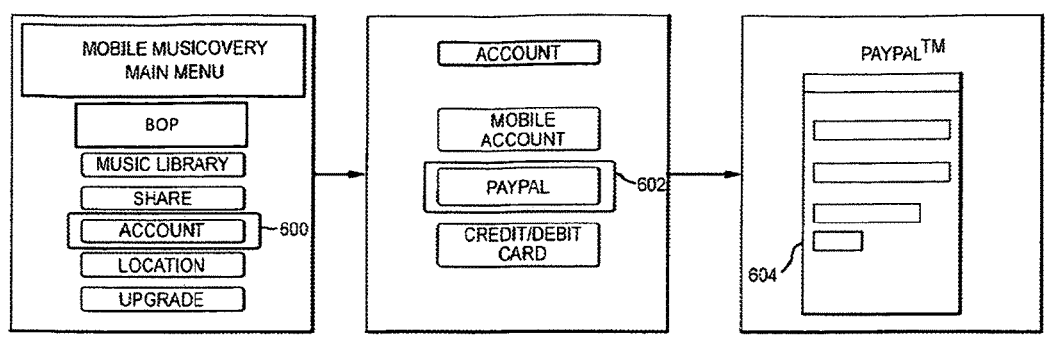

FIG. 12 shows how one or more payment mechanisms can be set up in advance in accordance with an embodiment of the invention. The user selects account 600 and then his or her preferred payment mechanism; in this example PayPal™ 602 is selected from a list also including mobile telephone account and financial transaction card. The user then enters particulars 604 for the payment mechanism selected and these are passed to the Apparatus 200 and stored there, both in a secure manner.

If the user selects More 520 on the track level screen 510, the user is directed to merchandising pages, where the user can buy merchandise or tickets related to the track. They should also be shown more media files available for download.

FIG. 10 also shows that selecting share directs the user to social media and communication options such as Facebook™ 420, Twitter™ 422, MySpace™ 424, and email 426 options, and a further click enables user access to their sharing technology, in this case Facebook pages 430. To facilitate this sharing the user may be directed to enter username and password, or other equivalent particulars, as part of the application set-up process. This enables the server 200 to set up and configure relevant application program interfaces (APIs) 255 for sharing such that the sharing indicated at the user application 100 can be implemented via the server 200 and in this case the distribution module 250 and allow the share recipient to download or stream the content in dependence on the permissions applying to the share event.

If the user device 10 is not provided with the application 100 before the user device is shipped, then the application can be downloaded from a link using a suitable wired or wireless communications protocol, for example the user device application 100 may be retrieved from server 30 via the user interface 260 and the internet/mobile/wireless/radio network 20. In order to obtain a copy of the application 100, the user is connected via the internet/mobile/wireless/radio network 20 to the server 30. The users device 10 interfaces with the apparatus 200 provided at the server 30 via the user interface 260. A request for the application is provided from the user device 10 to the distribution module 250 which accesses the application held in the application storage module 245 and transfers it to the user device 10 via the user interface 260 and the internet/mobile/wireless/radio network 20.

The application 100 may support two or more subscription levels, for example the first may be a "free" or "limited function" version that may have limited content such as a limited listing of media content such as a chart, such as a top 10 only, and/or may have limited content access permissions, such as one or more songs within the chart can only be accessed and played once by the user. In addition, the application may be available as a "paid for" "or "fully functional" version which has a more complete chart such as a branded ordered playlist (BOP) or perhaps a selection of different charts, such as the top 40 in US and top 40 in the UK, and one or more items of content within the chart have greater user access permissions, for example, four plays of each content or continuous play within a defined time period.

In one embodiment the apparatus is configured to send content samples, for example a 30 second extract from any track. Such track samples may be listened to a finite number of times or repeat played for a predetermined duration or a combination. In one embodiment, the consumption permissions of each track are related to the chart position. For example a track in the top 10 may have more limited access permissions than a track appearing outside the top ten. In such a case, a track outside the top 10 or under a particular promotion may be priced lower than a track inside the top 10.

Alternatively, or in addition, the consumption permission is set up by an administrator based on promotions intended to be offered. In one embodiment, the user may or may not be required to pay for the application. In an embodiment where the user is required to pay for the application, the distribution module 250 passes the user to a payment server (not illustrated) provided separate from the server 200. The payment server may be accessed via the interface 255. Payment servers are known to a person skilled in the art and consequently are not described in detail in this application. However, in one embodiment the user may be required to enter their credit card details and/or, where appropriate, a password in order for their payment to be verified. Following verification of payment, the distribution module 250 will then transfer the application from a storage module 245 to the user device 10 and activate it or just activate the application if it is already installed on the user device. Following activation of the application 100 according to the subscription level, the user is able to access all of the functions available at the server 200. It will be appreciated that other embodiments may include other payment methods or multiple payment options.

The user may select one or more of a plurality of different listing of media content such as a chart to access. The charts, with reference to songs, maybe for example, the top 40 R&B tunes, the top 40 classical tunes, the top 40 pop tunes, etc. The user may also select one of the plurality of charts based on their location, for example, the top 40 charts in Germany may be different from the top 40 charts provided in the UK or the US etc. Therefore, the user can access a chart relevant to their location and their tastes. The distribution module 250 receives the chart data via the digital media content interface 270 from a plurality of different chart providers 275. The distribution module 250 then provides the relevant chart to the user via the user interface 260. The user selected chart is provided to the user together with permission information setting out the users permissions to access the content (in this case songs) itemized in the chart. The permissions may indicate for example, the number of times the user can play each song within the chart or a duration within which the user can play each song in the chart an unlimited number of times, whether the user can share the songs detailed in the charts with other users, etc. The permissions are defined in the DRM module 205 and will be explained in further detail below.

In preferred embodiments, the content is configurable with default permissions for each of a number of user subscriber levels. A user level record for each user then records the consumption behavior (e.g. a list of events by content item) associated with each user. The events recorded include the user's own consumption events by track and optionally also events associated with social network friends. Such an approach enables administrators to set up permissions by track and the user level records can then be used to set up and monitor individual entitlements. For example, if a track falls out of the 40 and comes back in again later a user may only get remaining plays of their permitted entitlement. In other words, if they had entitlement to listen to a media file 5 times and listened to it 3 times before it dropped out of the listing of media content such as a chart, then if it re-enters the charts, the user may only be entitled to listen to the media file twice before buying it. The permissions and/or pricing may be adjusted from time to time or periodically, and optionally automatically, based on how often a user consumes content. The sentiment engine can access the user level records of consumption events and/or monitor the consumption events and modes directly, as will be explained later.

In one embodiment, the apparatus operates changing permissions based upon the degree to which a given user influences the consumption of other users. For example, the user level record can record data on the number of consumption events by social network friends of the user, or more specifically may record the number of consumption events by social network friends with whom the user directly shared the track. In such records, consumption events include any mode of consumption, for example any type of play, purchase or share of a track or a sample.

In some embodiments, the nature of the consumption event is also recorded such that more weight can be afforded to events like purchase. For example, in one embodiment, each event recorded by the sentiment engine 215 receives an allocated point score; for example tagging may equate to one point, whereas as commentary may equate to 3 points, a play may equate to 3 points and a purchase to 5 points. Score data can be analyzed and interpreted by research data module 175 in order to generate reports that can be provided to interested parties and which denote the popularity of content such as music based on user behavior, including, but not limited to, tagging, commentary, plays, purchases and others.

In one such embodiment the apparatus automatically (dynamically) adjusts permissions based on user influence data after predetermined periods or at predefined influence levels. Alternatively, or in addition, the apparatus may adjust pricing of subscriber levels or content items to individual users in dependence upon their influence data. This may allow administrators to alter how much users are charged (up and down) for the purchase of any given content.

The user is able to view the listing of media content such as a chart via the display device 170 at the user device 10. In one embodiment, the display device is a touch screen, such that user selections can be transferred from the display 170 to the sever 200, via the application 100. In another embodiment an input device (not illustrated) is provided at the device 10, such that the user can input selections.

As stated previously, the digital media content, such as chart data, video, audio, voice, games, ringtone, ringback tones, images, indexed or unindexed reading material and the like, is provided to the distribution module 250 from the plurality of chart providers 275. However, the content of the chart i.e., the data files corresponding to each item within the chart is held in the content storage module 291 at the server 200. The content, for example songs (although not limited to songs because it could be games, videos, etc.) may be stored in the storage module 291.

The methods and apparatus described may be implemented at least in part in software. Those skilled in the art will appreciate that the apparatus described may be implemented using general purpose computers or using bespoke equipment. Those skilled in the art will appreciate that the foregoing has described what is considered to be the best mode and, where appropriate, other modes of performing the invention, the invention should not be limited to the specific configurations and methods disclosed in this description of an embodiment of the invention. Those skilled in the art will recognize that the invention has a broad range of applications, and that the embodiments may take a wide range of modifications without departing from the inventive concept as defined by the appended claims.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods and apparatus described herein can be executed on a mobile station and on a computing device such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules hereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution. As mentioned, the user device 10 may be any device such as a mobile telephone, tablet, MP3 player, a lap top computer, a personal digital assistant (PDA), or the like which is provided with a communication interface and music playing capabilities with any type of communication capability such as wireless, WiFi, WiMax, third generation mobile technology (3G), fourth generation mobile communication technology (4G), or the like.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication systems, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD OR DVD-ROM, any other optical medium, punch cards paper tape, and other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A computer-implemented method of securely storing a content the on a non-transitory computer readable medium and playing the content the from the computer readable medium on a device comprising a content player, the method comprising:

receiving a content file, the content file comprising control information usable by the content player and payload information usable by the content player, the payload information including content data,
wherein the content player is configured to deconstruct the content the after the content file has been played based on access information indicating temporary access;
deconstructing the content file into a control information portion and a payload information portion;
adding packing data to the control information portion, wherein the packing data references a location of the payload information portion of adding packing data to the payload information portion, wherein the packing data references the control information portion and adding the packing data renders the control information or the payload information unusable by the content player;
separately storing the control information portion and the payload information portion; and
reconstituting the content file from the control information portion and the payload information portion based on the packing data.

2. The method of claim 1 wherein the at least the control information portion or the payload information portion is stored in a part of the device not visible to a user in normal use.

3. The method of claim 1 wherein the control information portion and the payload information portion are stored in a persistent random access memory (RAM) of the device inaccessible by the user.

4. The method of claim 1 wherein the content player is configured to play the content file by accessing reference information and reconstituting the control information portion and the payload information portion into a reconstituted content file such that the reconstituted content file is delivered to the content player in real-time.

5. The method of claim 1 wherein the content player is configured to receive deconstructed content file portions comprising at least one control information portion and at least one payload information portion and store the at least one control information portion and the at least one payload information portion on a computer readable medium of the device after the content file has been played based on access information indicating temporary access.

6. The method of claim 1 wherein the content player is configured to store the reconstituted file after playing based on access information indicating non-temporary access.

7. The method of claim 1 wherein the content player is configured to cause reconstitution of the control information portion and the payload information portion into a playable content file and store without playing in response to access information.

8. The method of claim 1 wherein the content file is encoded to reduce the file size and selectively remain unsuitable for mobile distribution and playback.

9. The method of claim 1 wherein the content file is video, audio, games, photographs, pictures, films, television, games, ringtones, ringback tones, documents, books, indexed reading material, or unindexed reading material.

10. The method of claim 1 wherein the content file is an audio file.

11. The method of claim 1 wherein random data information is added to header information of the content file.

12. An apparatus configured to securely store a content file on a remote computer readable medium and play the content the from the remote computer readable medium on a device comprising a content player, the apparatus comprising:
a processor; and
non-transitory computer-readable medium having computer-executable instructions for execution by the processor, the computer-executable instructions, when executed, cause the processor to:
receive a content file, the content file comprising control information usable by the content player and payload information usable by the content player, the payload information including content data,
wherein the content player is configured to deconstruct the content file after the content file has been played based on access information indicating temporary access; and
deconstruct the content file into a control information portion and a payload information portion;
add packing data to the control information portion, wherein the packing data references a location of the payload information portion or add packing data to the payload information portion, wherein the packing data references the control information portion and adding the packing data renders the control information or the payload information unusable by the content player;
separately store the control information portion and the payload information portion on the remote computer readable medium;
reconstitute the content file from the control information portion and the payload information portion based on the packing data.

13. The apparatus of claim 12 wherein the at least the control information portion or the payload information portion is stored in a part of the device not visible to a user in normal use.

14. The apparatus of claim 12 wherein the control information portion and the payload information portion are stored in a persistent random access memory (RAM) of the device inaccessible by the user.

15. The apparatus of claim 12 wherein the content player is configured to play the content file by accessing reference information and reconstituting the control information portion and the payload information portion into a reconstituted content file such that the reconstituted content file is delivered to the content player in real-time.

16. The apparatus of claim 12 wherein the content player is configured to receive deconstructed content file portions comprising at least one control information portion and at least one payload information portion and store the at least one control information portion and the at least one payload information portion on a computer readable medium of the device after the content file has been played based on access information indicating temporary access.

17. The apparatus of claim 15 wherein the content player is configured to store the reconstituted file after playing based on access information indicating non-temporary access.

18. The apparatus of claim 12 wherein the content player is configured to cause reconstitution of the control information portion and the payload information portion into a playable content file and store without playing in response to access information.

19. The method of claim 12 wherein the content file is encoded to reduce the file size and selectively remain unsuitable for mobile distribution and playback.

20. The method of claim 12 wherein the content file is video, audio, games, photographs, pictures, films, television, games, ringtones, ringback tones, documents, books, indexed reading material, or unindexed reading material.

21. The apparatus of claim 12 wherein the content file is an audio file.

22. The apparatus of claim 12 wherein random data information is added to header information of the content file.

* * * * *